United States Patent [19]

Murakawa et al.

[11] Patent Number: 4,926,624
[45] Date of Patent: May 22, 1990

[54] LAWN MOWER

[75] Inventors: Masatake Murakawa; Niro Bando, both of Sakai; Masatsugu Tone, Hashimoto; Mikio Yuki, Kawachinagano; Junji Miyata, Kyoto; Tetsuaki Hayashi, Osaka; Kazuaki Kurohara, Sakai, all of Japan

[73] Assignee: Kubota, Ltd., Osaka, Japan

[21] Appl. No.: 333,753

[22] Filed: Apr. 3, 1989

Related U.S. Application Data

[63] Continuation of Ser. No. 109,967, Oct. 19, 1987, abandoned.

[30] Foreign Application Priority Data

Oct. 21, 1986 [JP] Japan ................................. 61-251290
Oct. 21, 1986 [JP] Japan ............................ 61-161736[U]
Oct. 21, 1986 [JP] Japan ............................ 61-161737[U]

[51] Int. Cl.⁵ ............................................. A01D 34/70
[52] U.S. Cl. ......................................... 56/202; 56/16.6
[58] Field of Search .................... 56/320.1, 320.2, 202, 56/16.6; 248/99, 101

[56] References Cited

U.S. PATENT DOCUMENTS

| | | | |
|---|---|---|---|
| 3,143,843 | 8/1964 | Allina | 56/202 |
| 3,716,977 | 2/1973 | Jackson | 56/202 |
| 4,156,337 | 5/1979 | Knudson | 56/16.6 |
| 4,168,600 | 9/1979 | Klug et al. | 56/202 |
| 4,244,160 | 1/1981 | Carolan | 56/202 |
| 4,393,645 | 7/1983 | Moore | 56/202 |
| 4,398,689 | 8/1983 | Prader | 248/99 |
| 4,532,755 | 8/1985 | Schemelin et al. | 56/202 |
| 4,589,251 | 5/1986 | Amano et al. | 56/202 |

FOREIGN PATENT DOCUMENTS 3532700 3/1987 Fed. Rep. of Germany ........ 56/202

Primary Examiner—John Weiss
Attorney, Agent, or Firm—Jordan and Hamburg

[57] ABSTRACT

A lawn mower comprising a cutting unit disposed between front and rear wheels, a grass discharge duct extending rearwardly from the cutting unit, and grass collecting containers each defining a top opening for receiving grass clippings sent through the discharge duct. The containers are supported by an E-shaped frame connected to, and retained by pins in, open rear ends of right and left pipe frames extending rearwardly and then upwardly from a mower body. The E-shaped frame engages the open rear ends of the pipe frames to interconnect the rear ends with a selected spacing therebetween.

12 Claims, 6 Drawing Sheets

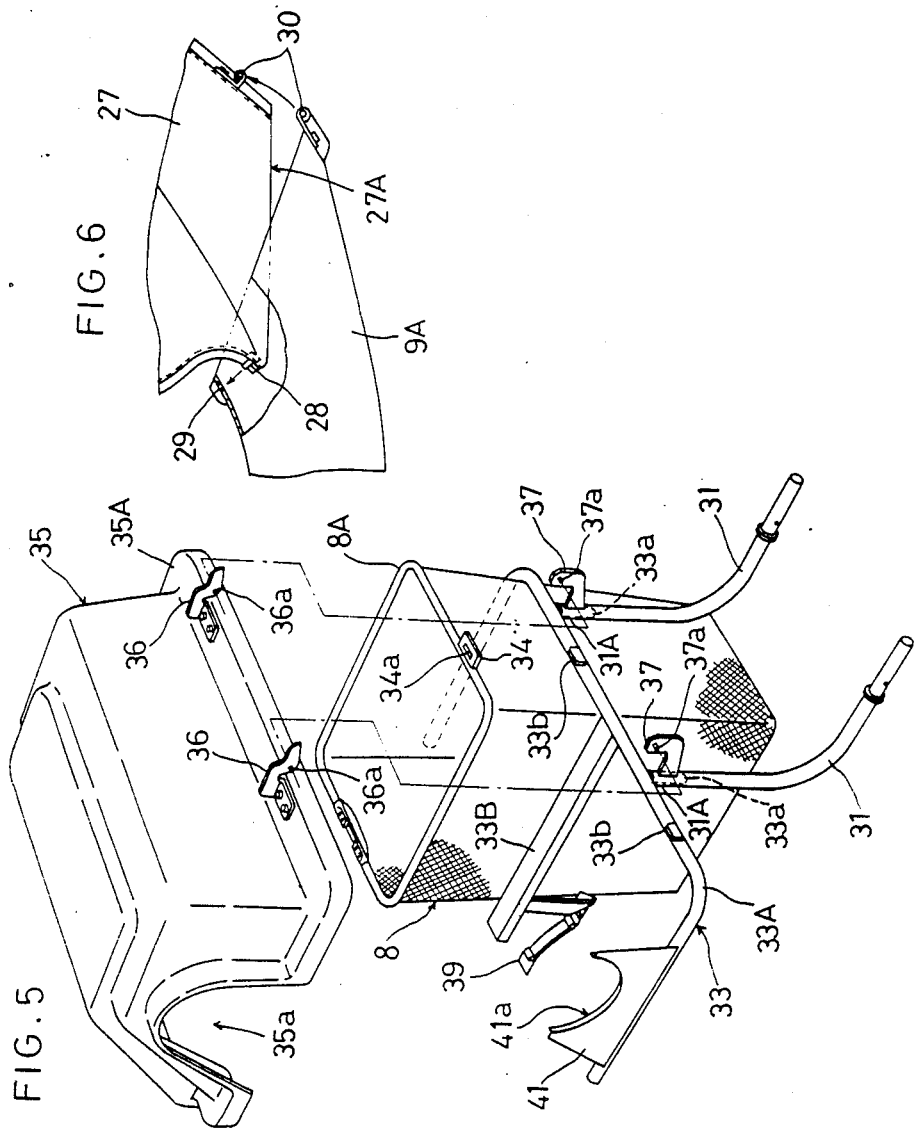

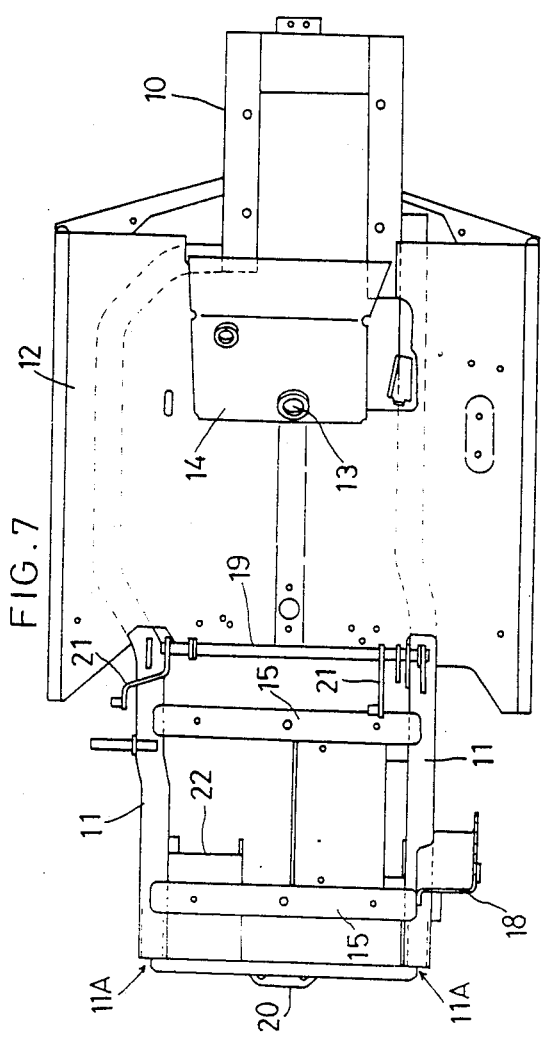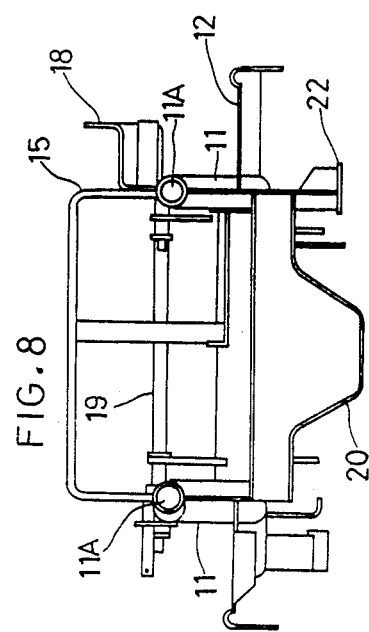

LAWN MOWER

This application is a continuation of application Ser. No. 109,967, filed Oct. 19, 1987, now abandoned.

BACKGROUND OF THE INVENTION

The present invention relates to an improvement in a lawn mower.

A known lawn mower comprises a pipe frame of inverted U-shape acting as bracket for supporting a grass collecting container or containers attached to the mower body. The pipe frame is inserted into, and retained by pins in, a pair of right and left pipe type sockets mounted on a rear end face of the mower body. (see, for example, the Japanese utility model application laid open under No. 60-94037 and U.S. Pat. No. 4,589,251.)

The above known construction, however, requires the pipe type sockets additionally provided on the mower body. Thus the number of parts is increased by so many.

Besides, since the pipe frame has the U-shape, it is difficult to carry many of the together because they become very bulky. Since the pipe frame is a U-shaped integral unit, a slight manufacturing error would result in difficulties in inserting the pipe frame into the pipe type sockets mounted on the body frame. This problem also remains to be solved.

Another known example of bracket for supporting the grass collecting container comprises a single flat bar or the like erected at the rear end of the mower body as disclosed in U.S. Pat. No. 4,393,645. This prior construction has a different problem.

It is general practice, when storing this type of lawn mower in a warehouse or the like, to lift the front of the mower body and use the attachment or grass container connecting bracket or frame as substitute for a stand. However, the single bracket or frame provided at the rear end of the mower body is too unstable to be used as a stand.

SUMMARY OF THE INVENTION

A first object of the present invention is to provide a simple improvement in the body frame construction thereby to avoid the increase in the number of parts.

In order to achieve this object, a lawn mower according to the present invention comprises a pair of right and left main frames formed of pipes and defining end openings at rear ends thereof, respectively, a pair of right and left connecting members for connecting a working attachment, the connecting .members being insertible into the end openings of the main frames, and fixing means for rigidly retaining the connecting members inserted into the end openings of the main frames.

In the above construction, the main frames are formed of pipes extending to positions for connecting the working attachment. Thus, extension ends or rear open ends of the main pipe frames may be used also as working attachment mounting bracket without any modification.

Consequently, although this construction is similar to the known construction in that the working attachment connecting members are inserted into the pipes, the main frames formed of pipes also act as bracket for supporting the attachment connecting members, thereby to avoid the increase in the number of parts.

A second object of the present invention is to provide a lawn mower comprising working attachment connecting members usable as a stand when the lawn mower is stored, and attachable to the mower body with ease, such connecting members not becoming very bulky when many of them are transported together.

In order to achieve this object, a lawn mower according to the present invention comprises means provided on a mower body and defining a pair of right and left end openings, a pair of right and left connecting members for connecting a working attachment, each of the connecting members being formed of an independent elongate material, with at least part of the connecting member extending substantially vertically and an end thereof being insertible into one of the end openings, fixing means for rigidly retaining the ends of the connecting members inserted into the end openings of the main frames, and link means for interconnecting the other ends of the connecting members to determine a spacing therebetween.

When each of the working attachment connecting members is fixed to the mower body, at least part of the connecting member extends substantially vertically. This part of the connecting member will contact the ground when the mower front is lifted for storage. Besides, the connecting members are provided right and left to be used as a stand for supporting the mower in storage in a stable manner.

Furthermore, the connecting members comprise an independent elongate material, respectively, and are broken apart into a relatively simple shape once the link means interconnecting the other ends thereof is removed. Thus, many connecting members may be transported together with ease without becoming very bulky. Even if there is a minor manufacturing error, the connecting members may separately be inserted into the open ends without any problem.

Other objects and advantages of the present invention will be apparent from the following description.

BRIEF DESCRIPTION OF THE DRAWINGS

FIG. 5 is a perspective view showing how the grass collecting containers are attached to the mower body, FIG. 6 is a plan view showing a position of a cutting unit and the grass collecting containers before connection to each other, FIG. 7 is a plan view of a frame structure of the mower body, and FIG. 8 is a rear view of the frame structure of the mower body.

DESCRIPTION OF THE PREFERRED EMBODIMENT

Figure 1:
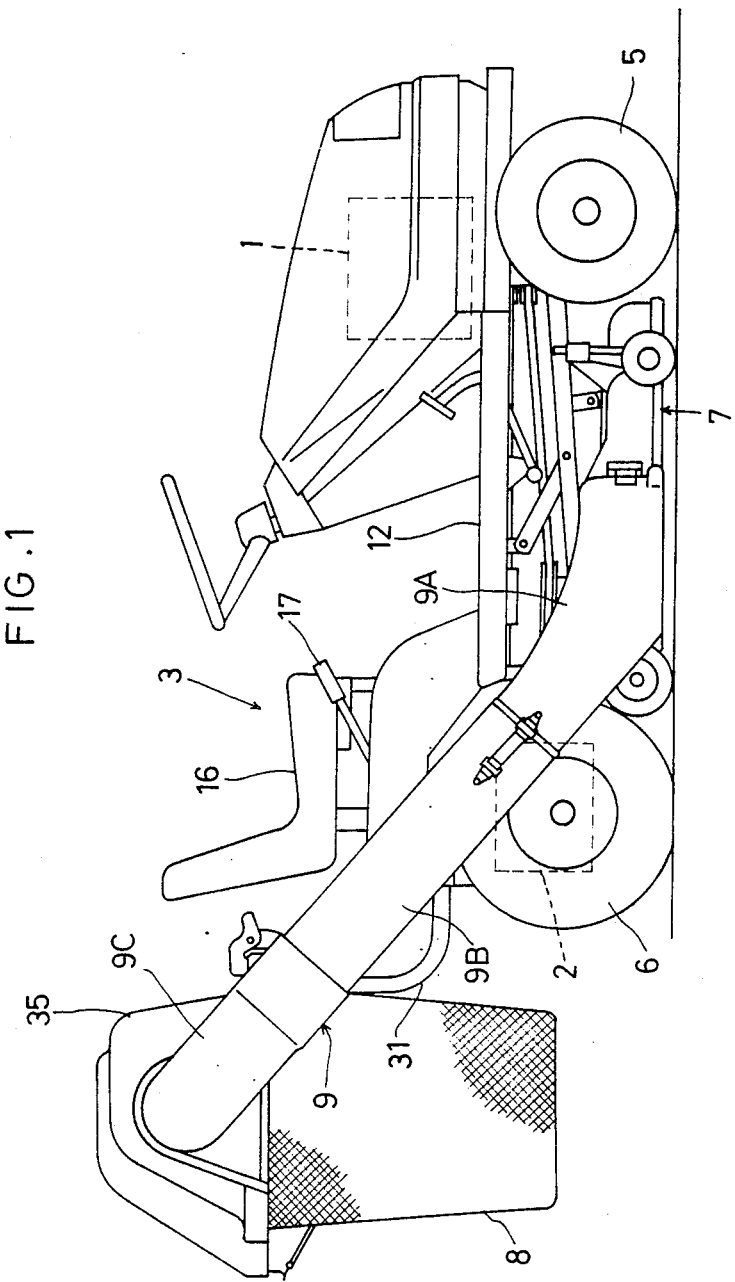
FIG. 1 is a side elevation of a lawn mower.

As shown in FIG. 1, a riding lawn mower comprises an engine 1 mounted at a front portion thereof and having a downwardly extending output shaft, a transmission case 2 mounted at a rear portion thereof, and a driver's section 3 between the engine 1 and the transmission case 2. A midmount type grass cutting unit 7 is disposed between front wheels 5 and rear wheels 6.

Grass collecting containers 8 are attached to a rear end of the mower, and a grass discharge duct 9 extends from the cutting unit 7 laterally outwardly of the mower and rearwardly to the grass collecting containers 8.

A framework forming the vehicle body will be described next. As shown in FIG. 2, 3, 7 and 8, the framework comprises an engine support frame 10 including a pair of right and left angle bars connected to each other. A pair of right and left main frames 11 formed of pipes extends rearwardly from the engine support frame 10, with rear ends thereof cut to define openings 11A. A flat deck 12 formed of sheet metal extends over top faces of the right and left main frames 11. A steering mechanism support frame 14 defining a bore 13 for receiving a steering stem extends upwardly from a portion of the deck 12 adjacent the engine support frame 10. The main frames 11 support a pair of erected block frames 15 arranged longitudinally of the mower at rearward portions of the main frames 11, which block frames constitute a support frame for a driver's seat 16 and fenders of the rear wheels 6. Laterally of the driver's seat support frame 15 there are provided a lever 17 for adjusting a cutting height of the grass cutting unit 7 and a lever locking frame 18. Control operations of the lever 17 are transmitted to the cutting unit 7 through a control shaft 19 and pivot arms 21. At the rear end of the main frames 11 there is provided a hitch 20 for connecting a small trailer, which is fabricated by welding plate materials into a channel form, and a frame 22 for mounting the transmission case 2 extends forwardly from the hitch 20.

The cutting unit 7 is driven through a transmission system including an input pulley shaft 23 operatively connected to the engine 1 by a belt, and a belt 43 transmitting power from the input pulley shaft 23 to a pair of right and left blade shafts 24. Number 25 in FIG. 3 indicates a tension pulley.

Figure 2:
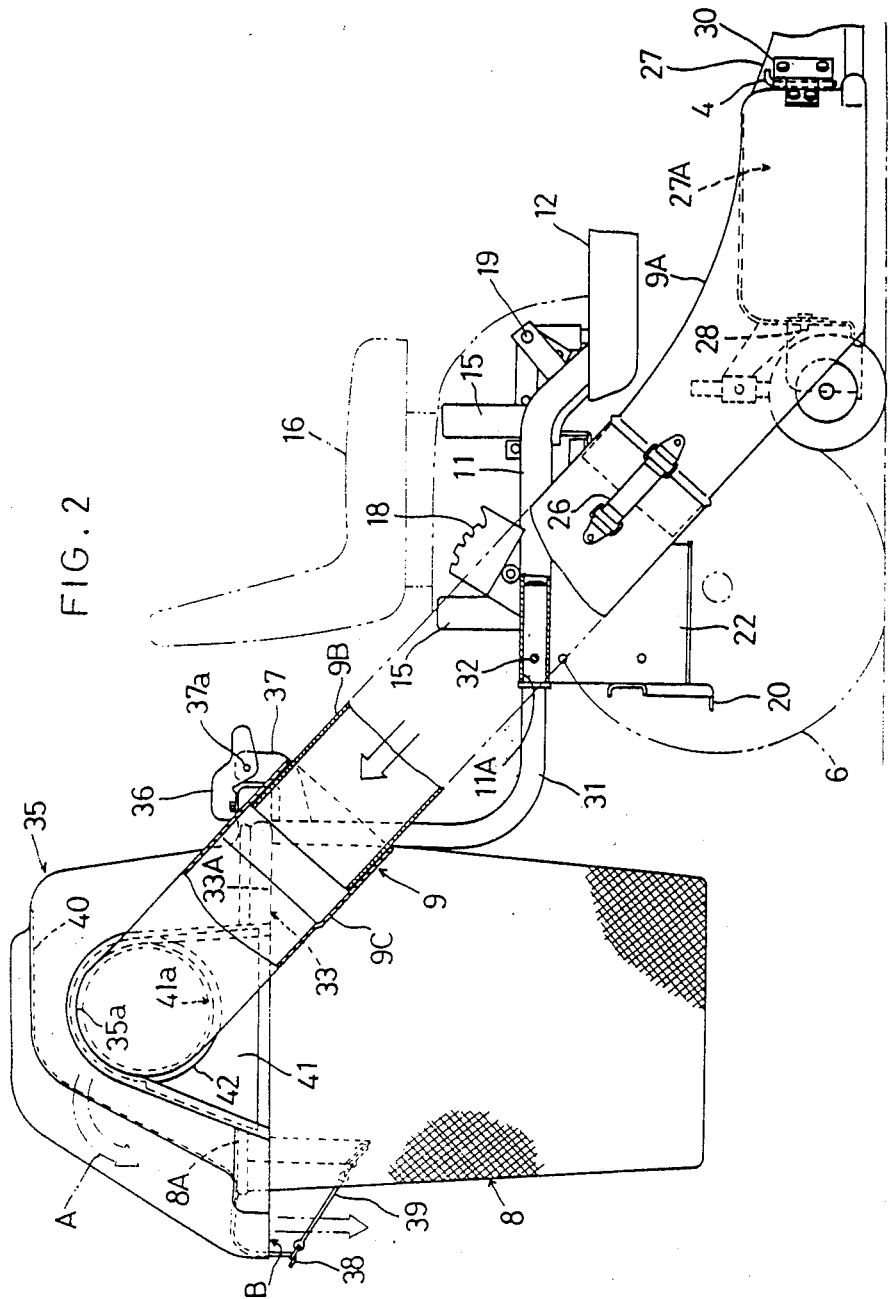
FIG. 2 is a side view showing an arrangement of a grass discharge duct, grass collecting containers and a mower body.
Figure 3:
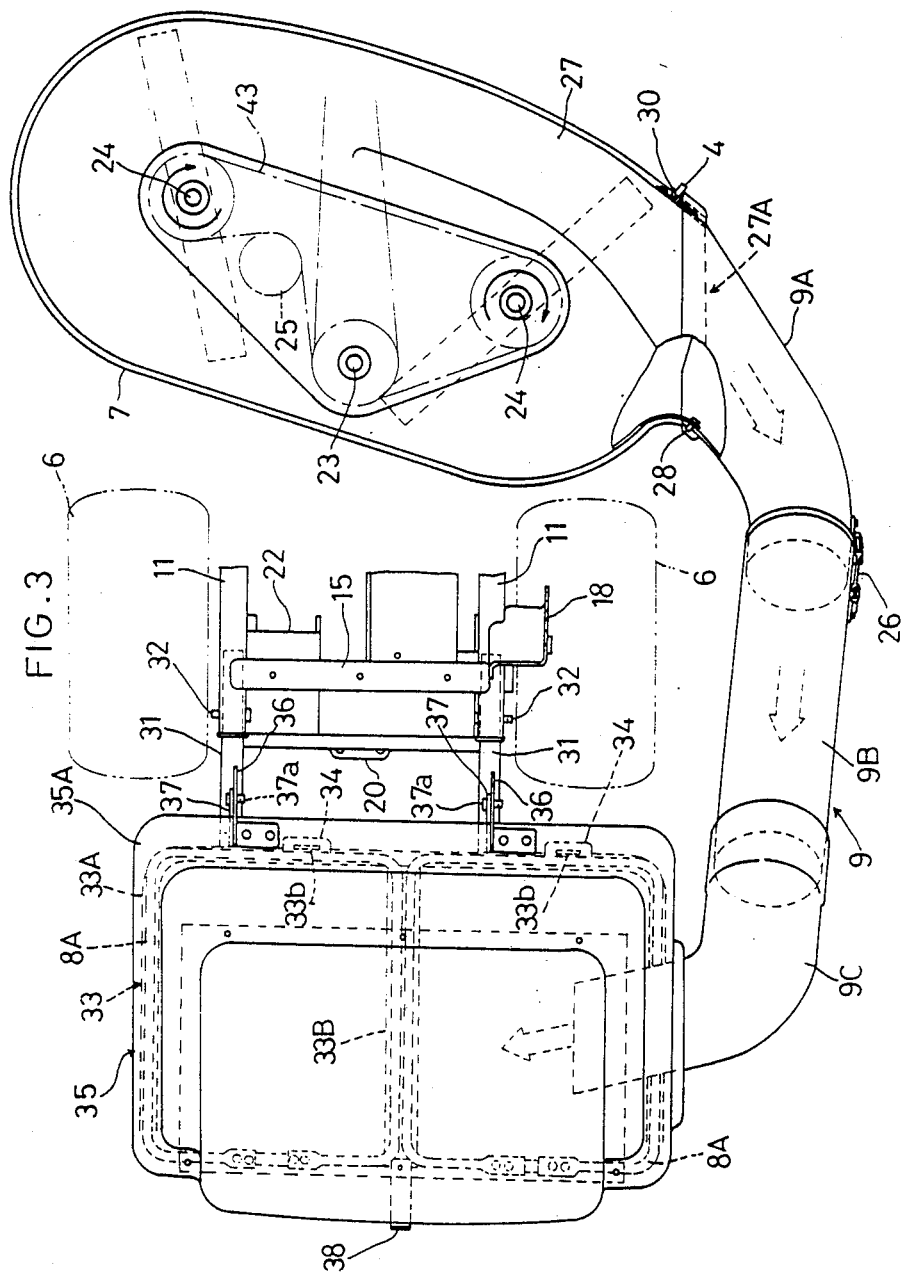
FIG. 3 is a plan view showing the arrangement of the grass discharge duct, grass collecting containers and mower body.
Figure 4:
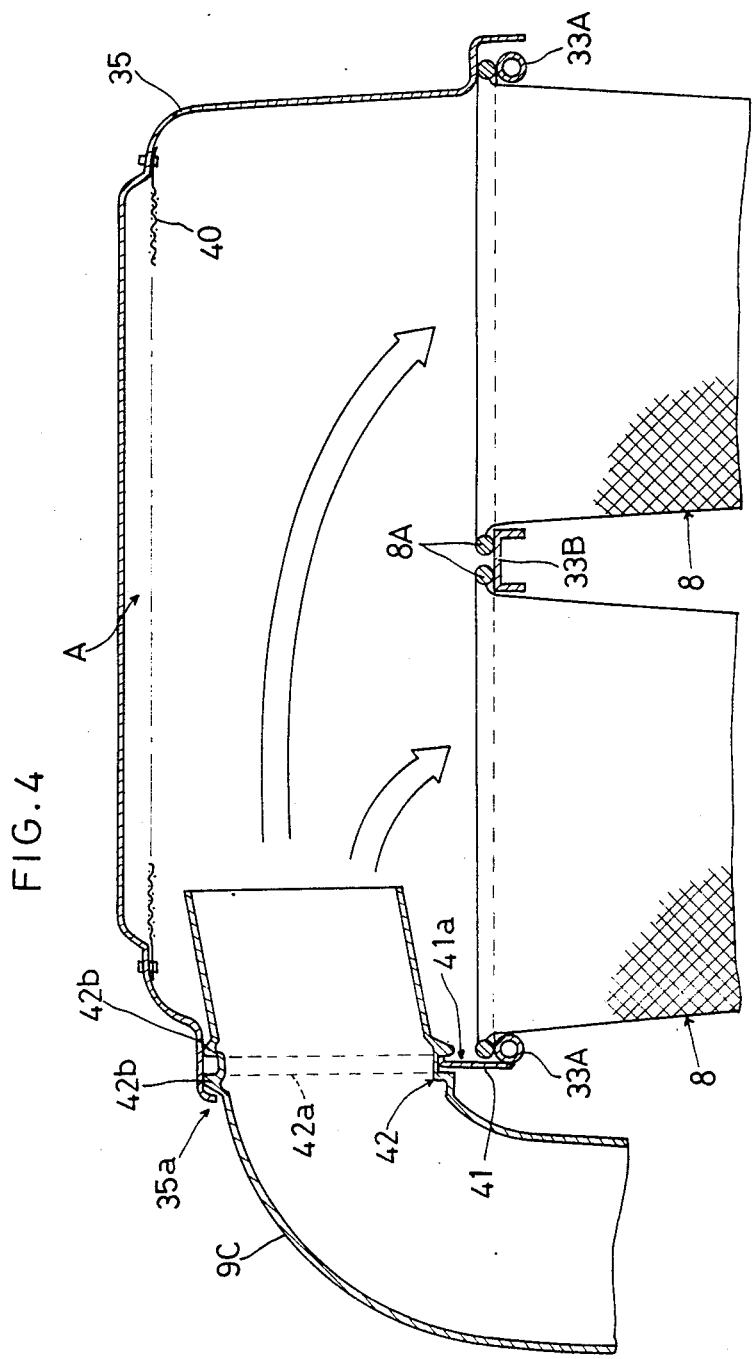
FIG. 4 is a front view in vertical section showing a connection between the discharge duct and a movable cover/support structure.

The grass discharge duct 9 will be described next. As shown in FIGS. 2 and 3, the grass discharge duct 9 extends from the grass cutting unit 7 to the grass collecting containers 8, laterally outwardly bypassing the right rear wheel 6. The grass discharge duct 9 comprises a front duct 9A connected to the cutting unit 7, a rear duct 9C extending to the grass collecting containers 8, and an intermediate duct 9B interconnecting the front and rear ducts 9A and 9C. The intermediate duct 9B is formed of a transparent plastic material to enable the driver to see conveyance conditions of grass clippings. The rear duct 9C has a forward end surrounding a rear end of the intermediate duct 9B for relative axial sliding movement therebetween to allow for vertical movements of the cutting unit 7 incidental to reaping height adjustment thereof. The intermediate duct 9B has a forward end surrounding a rear end of the front duct 9A, and is fixed to the front duct 9A by a rubber band type metal clasp 26. The front duct 9A has a sectional shape changing from circular to rectangular progressively toward the cutting unit 7 to be connected to the cutting unit 7 with a forward end thereof surrounding a rectangular outlet opening 27A defined in an outer case 27 of the cutting unit 7. This connection includes an engaging pin 28 secured to and projecting from a lateral wall of the outlet opening 27A, and a perforation 29 defined in a lateral wall of the front duct 9A (FIG. 6) which is penetrated by the engaging pin 28. On the opposite side of the connection the front duct 9A and the lateral wall of the outlet opening 27A carry coupling elements which form a hinge-like clasp 30 when interconnected. An L-shaped pin 4 is inserted from above into the clasp 30 after the front duct 9A is placed around the outlet opening 27A, thereby completing the connection between the front duct 9A and the outer case 27 of the cutting unit. As shown in FIG. 6, the front duct 9A is connected to the outer case 27 by first placing the perforation 29 in the front duct 9A in engagement with the engaging pin 28, then pivoting the front duct 9A about the engaging pin 28, and fastening the clasp 30 with the L-shaped pin 4.

A mounting structure for the grass collecting containers 8 will be described next. As shown in FIGS. 2 through 5, support frames 31 formed of elongate pipes and acting as connecting means each have an end extending into the rear end opening 11A of the main frame 11 and are detachably connected to the main frames 11 by engaging pins 32 acting as fixing means extending through the support frames 31 and the main frames 11. The support frames 31 include rear end portions extending upwardly and terminating with upwardly directed openings 31A to which a fixing frame 33 is securely connected to act as support member for supporting a pair of right and left grass collecting containers 8 described later. This connecting structure includes a pair of right and left engaging pipe elements 33a projecting downwardly from the fixing frame 33 and inserted into the upwardly directed openings 31A of the support frames 31. This fixing frame 33 has a substantially E-shaped construction when viewed in plan, consisting of a pipe frame 33A substantailly U-shaped in plan view and a center channel frame 33B, and extends rearwardly in a cantilever fashion. Thus, the pipe frame 33A acts as means to determinig a spacing between the other ends of support frames 31. Each of the grass collecting containers 8 has a top opening with a mouthpiece 8A extending along peripheries of the top opening. The grass collecting containers 8 are set in position on the fixing frame 33 so that the mouthpieces 8A contact the pipe frame 33A and channel frame 33B from above and over entire lengths thereof. The mouthpiece 8A of each grass collecting containers 8 includes a plate member 34 projecting therefrom and defining an engaging bore 34a, and the pipe frame 33A of the fixing frame 33 includes projections 33b. The projections 33b extend through the engaging bores 34a, respectively, when the grass collecting containers 8 are mounted on the fixing frame 33, thereby setting the grass collecting containers 8 in position.

An openable and closable cover 35 of the right and left cover 35 will be described next. This cover 35 includes a lower flange 35A adjacent the support frames 31, which flange carries fixed thereto a pair of right and left brackets 36 defining horizontal engaging bores 36a. The support frames 31 each have a projecting plate piece 37 including a horizontal pin 37a having a head. The pins 37a are placeable in rigid engagement with the engaging bores 36a, whereby the cover 35 is vertically pivotable on the pins 37a. This construction constitutes a simple attachment structure for the cover 35 wherein the cover 35 mounted the fixing frame 33 or grass collecting containers 8 is caused to slide transversely of the mower to place the pins 37a in engagement with the engaging bores 36a. The cover 35 has a catch 38 at a side opposite to the side having the brackets 36, which catch is engageable with a metal fastener 39 secured to an end of the channel frame 33B of the fixing frame 33, thereby to maintain the cover 35 in a closed position retaining the grass collecting containers 8 from above.

This openable and closable cover 35 has a considerable weight which itself is effective to retain the grass collecting containers 8 from above. The cover 35 covers the grass collecting containers 8 so as to intercommunicate spaces above the containers 8, and includes a netting member 40 extending across an interior space of the cover 35, whereby an air vent passage A is formed to extend from the spaces above the containers 8 to a rearward space in the cover 35. When the containers 8 are filled with grass crippings or disposal bags having poor gas permeability are used, air is vented through the netting member 40 to flow along inside walls of the cover and out through an opening B at a rear lower end of the cover 35. When such disposal bags are not used, air is vented through the grass collecting containers 8.

A construction for connecting the rear duct 9C of the grass discharge duct to the openable and closable cover 35 will be described in detail hereinafter. The pipe frame 33A of the fixing frame 33 include a plate-like holder 41 defining an upwardly opening recess 41a. The cover 35 includes a lateral side defining a downwardly opening recess 35a at a position opposed to the holder 41. The recess 41a of the holder 41 and the recess 35a of the cover 35 in the closed position together form an opening for receiving the rear grass discharge duct 9C. The rear duct 9C has an annular ridge type engaging portion 42 on an outer periphery opposed the recesses 41a and 35a, which includes an engaging groove 42a defined between a pair of right and left ridges 42. A lower portion of the engaging groove 42a receives an edge of the holder 41 defining the recess 41a, whereby the rear duct 9C is securely attached by engaging inner edges of the two recesses 41a and 35a. The cover 35 does not include a ridge or the like for engaging the engaging groove 42a but just presses upon the rear duct 9C from above. If a ridge or the like were formed on the cover 35, the rear duct 9C could be lifted owing to the engagement between the ridge and the engaging groove 42a when the cover 35 is upwardly pivoted and opened. The above construction provides no such possibility.

While a riding lawn mower is described in the foregoing embodiment, the present invention is of course applicable to a walking operator type lawn mower as well. In practice, the invention may be modified in various ways. In the described embodiment the grass discharge duct 9 defines the engaging groove 42a in an outer periphery of a rear end portion thereof for receiving the edge of the holder 41 in a lower portion of the engaging groove 42a. Conversely, engaging grooves may be formed in the holder 41.

We claim:

1. A lawn mower including a pair of grass catchers and means for mounting the grass catchers, the lawn mower having a pair of right and left frame members defining main frames, the mounting means comprising:
    (a) end openings provided at at least rear end regions of the respective frame members, the end openings extending along a center line longitudinally of the mower and opening rearwardly,
    (b) a pair of L-shaped connecting members formed of pipes, one leg of each of the L-shaped members having a distal end insertable into a respective one of the end openings such that the other leg of the respective L-shaped member is vertically arranged,
    (c) fixing means for rigidly retaining connected portions of the connecting members inserted into the end openings, and
    (d) a support member for mounting the pair of grass catchers, the support member having a frame structure and including engaging elements remote from each other for being removably connected to the vertical legs of the respective connecting members, thereby defining a space between the connecting members and maintaining the support member substantially horizontal, each of the grass catchers having a top opening and a mouthpiece extending along the periphery of the top opening, the mouthpiece resting upon the frame structure and the frame structure thereby supporting the grass catchers.

2. A lawn mower as claimed in claim 1 further comprising a projecting piece fixed to one of the support member and the mouthpiece (8A), and a receiving bore defined in the other of the support member and the mouthpiece, the projecting piece and the receiving bore being engageable with each other to connect the grass catcher to the support member.

3. A lawn mower as claimed in claim 2 wherein the support member includes a connectable frame substantially U-shaped in plan view and a center frame extending from a center position of the connectable frame, whereby the support member has a substantially E-shape in plan view and supports the mouthpieces of the two grass catchers.

4. A lawn mower as claimed in claim 3 wherein the connectable frame is formed of a pipe and the center frame is formed of a channel piece.

5. A lawn mower as claimed in claim 4 further comprising an openable and closable cover pivotably disposed above the support member for covering the support member from above.

6. A lawn mower as claimed in claim 5 wherein the support member carries a holder defining an upwardly opening recess.

7. A lawn mower as claimed in claim 6 wherein the cover includes a lateral side defining a downwardly opening recess at a position opposed to the holder, the recess of the cover in a closed position and the upwardly opening recess of the holder defining an opening for receiving a rear end of a grass discharge duct extending from grass cutting means, the grass discharge duct defining an annular engagement portion extending peripherally of the rear end thereof for engagement with an inner edge of the recess of the holder.

8. A lawn mower including a pair of grass catchers and means for mounting the grass catchers, each of the grass catchers defining a mouthpiece at a top opening thereof, the lawn mower having a pair of right and left frame members defining main frames, the mounting means comprising:
    (a) end openings provided at at least rear end regions of the respective frame members, the end openings extending along a center line longitudinally of the mower and opening rearwardly,
    (b) a pair of L-shaped connecting members formed of pipes, one leg of each of the L-shaped members having a distal end insertable into a respective one of the end openings such that the other leg of the respective L-shaped members is vertically arranged,
    (c) fixing means for rigidly retaining connected portions of the connecting members inserted into the end openings,
    (d) a support member for mounting the pair of grass catchers, the support member having a frame structure and including engaging elements remote from each other for being connected to the vertical legs of the respective connecting members, thereby defining a space between the connecting members and maintaining the support member substantially horizontal, the support member including a connectable frame substantially U-shaped in plan view and a center frame extending from a center position of the connectable frame, whereby the support member has a substantially E-shape in plan view and supports the mouthpieces of the two grass catchers, and (e) for each of the grass catchers a projecting piece fixed to one of the support member and the mouthpiece, and a receiving bore defined in the other of the support member and the mouthpiece, the projecting piece and the receiving bore being engageable with each other to connect the grass catcher to the support member.

9. A lawn mower as claimed in claim 8 wherein the connectable frame is formed of a pipe and the center frame is formed of a channel piece.

10. A lawn mower as claimed in claim 9 further comprising an openable and closable cover pivotably disposed above the support member for covering the support member from above.

11. A lawn mower as claimed in claim 10 wherein the support member carries a holder defining an upwardly opening recess.

12. A lawn mower as claimed in claim 11 wherein the cover includes a lateral side defining a downwardly opening recess at a position opposed to the holder, the recess of the cover in a closed position and the upwardly opening recess of the holder defining an opening for receiving a rear end of a grass discharge duct extending from grass cutting means, the grass discharge duct defining an annular engagement portion extending peripherally of the rear end thereof for engagement with an inner edge of the recess of the holder.

* * * * *